April 28, 1925.
J. B. WOOSTER
EDUCATIONAL DEVICE
Filed Feb. 7, 1924
1,535,706
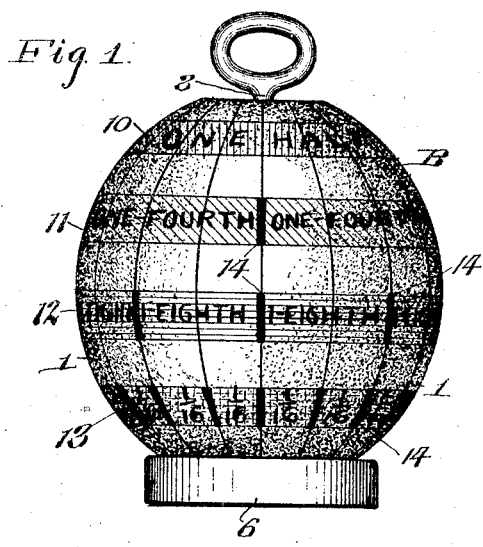
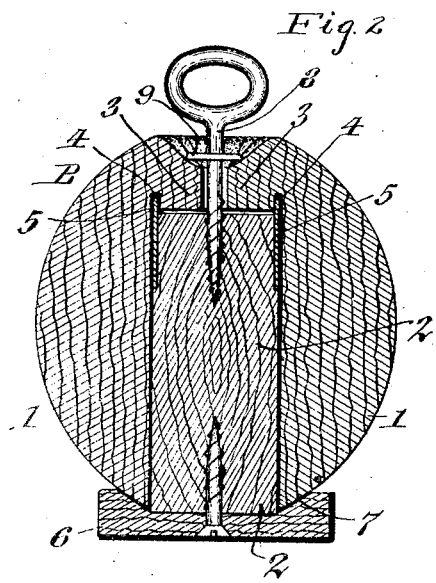
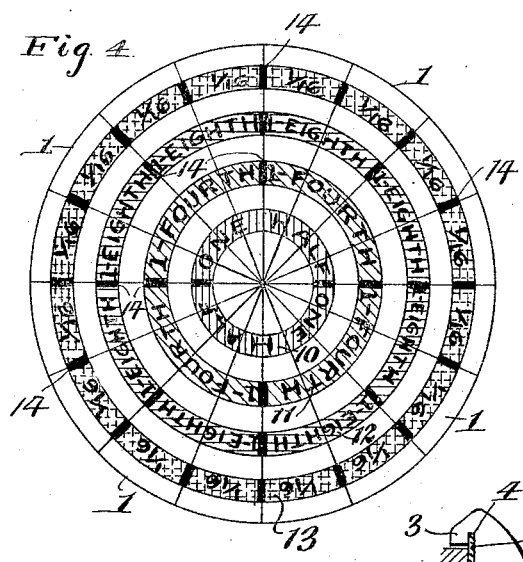
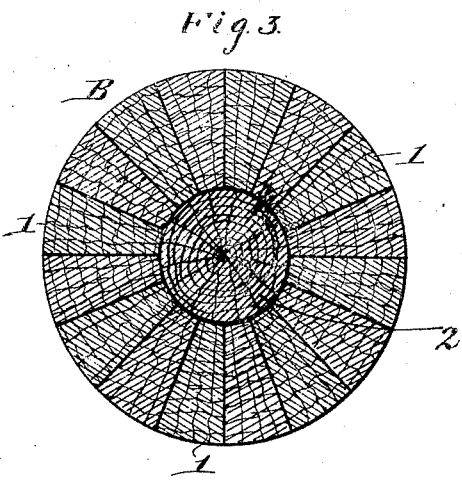
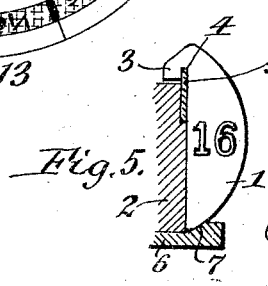
Inventor
James B. Wooster
by Popp & Powers
Attorneys.

Patented Apr. 28, 1925.

1,535,706

UNITED STATES PATENT OFFICE.

JAMES B. WOOSTER, OF BUFFALO, NEW YORK.

EDUCATIONAL DEVICE.

Application filed February 7, 1924. Serial No. 691,082.

*To all whom it may concern:*

Be it known that I, JAMES B. WOOSTER, a citizen of the United States, residing at Buffalo, in the county of Erie and State of New York, have invented a new and useful Improvement in Educational Devices, of which the following is a specification.

This invention relates to improvements in educational devices and more particularly to a device intended to facilitate the study of fractions in the primary grades and to enable the student to acquire a certain and accurate understanding of the subject in less time and with less effort than is ordinarily required.

Heretofore fractions were taught by cutting an apple or other natural object into the desired number of pieces or segments but this method is unclean and is not a permanent object lesson inasmuch as the sections decay and soon become unsanitary.

The object of the invention is to provide a simply constructed device which may be readily manipulated by the student and by such manipulation will give actual demonstration of fractional values in relation to one another and to the whole in a sanitary manner.

The device is based in principle on the employment of a body of suitable form, preferably fashioned in simulation of some well known natural object and the division of that body into a predetermined number of parts and the invention consists generally in a simply constructed device wherein the parts may be removed individually or in any desired aggroupment, leaving the remainder of the body in its normal assembly and the fractional values of the part or parts removed and of the parts remaining will be so indicated that they can at once be apprehended and understood by children in the primary grades.

An embodiment of the invention is illustrated in the accompanying drawings, wherein:

Figure 1 is an elevation of the device in a form which, now considered, is preferred.

Figure 2 is a central vertical sectional view.

Figure 3 is a central horizontal sectional view, and Figure 4 is a developed plan view.

Figure 5 is a fragmentary sectional elevation.

The device includes a body indicated generally as B, which preferably has a circular cross section and is formed in simulation of some well known natural object of regular or symmetrical outline, for example an orange or apple. The body B is composed of a predetermined number of segments 1 which are removably fitted with reference to a common support 2. The support 2 is preferably in the form of a cylindrical core which is enclosed within and is normally concealed by the segments 1. The segments are formed at their upper ends with horizontally extending portions 3 which overhang the core 2 and are formed with vertical recesses 4 extending to their inner faces. The recesses 4 are arcuate and are provided as chords of a circle to which each recess conforms. The core 2 is provided with an annular flange 5 which projects beyond its upper end and is engageable in the recesses 4. The core 2 is mounted upon a flat supporting base 6 of suitable extent, the upper face of which is formed to provide a recess 7 concentric to the core and which conforms in outline and size to the portions of the segments 1 at or near the lower ends of said segments.

In the assembly of the body B the segments are fitted with their recesses 4 engaged over the flange 5 and their lower end portions engaged within the recess 7 of the base 6. By such assembly the segments are held against lateral displacement but may be individually removed from the body by moving them upward relatively to the core 2 until their recesses 4 pass beyond the flange 5, at which time they may be withdrawn from the body by a lateral movement. The segments are preferably positively confined in their assembled relation and for this purpose a screw 8 having a clamping head 9 may be removably fitted in the upper end of the core 2, the head 9 engaging the segments along their upper sides, that is to say at the upper end of the body B. The screw 8 may also be utilized to provide a handle by which the device may be readily carried from place to place.

The segments 1 are preferably, although not necessarily, all of the same size and may be provided in any desired number. Since the object of the device is to teach the principles of fractions rather than to teach any particular series of fractions it is, of course, immaterial as to what particular fractions are selected for illustration. For the purposes of teaching and study the fractions represented by the powers of 2 are doubtless the most suitable and convenient and such fractions are shown in the device illustrated. Thus by the provision of sixteen equal segments 1 the device may be used to demonstrate halves, fourths, eighths and sixteenths. These values are preferably displayed on the body B in such a way as clearly to indicate the segments by which the values are constituted. Preferably the different values are marked along rings or bands suitably imprinted upon the body and preferably produced in different colors in order that they may be readily distinguished. Thus the value one-half is displayed twice on a band 10 imprinted on the body B near its upper end; the value one-fourth is displayed four times on a band 11 imprinted on the body B below the band 10; the value one-eighth is displayed eight times on a band 12 arranged below the band 11, and the value one-sixteenth is displayed sixteen times on a band 13 arranged below the band 12. The values may be displayed either by words or by numerals as may be found most convenient and the imprinting of each value subtends the number of segments required to constitute the values. Thus two groups, each of eight segments, each bears the words "one-half" so arranged as to extend over all of the segments of the group; four groups, each of four segments, each bears the designation "one-fourth" so arranged as to subtend all of the segments of the group; eight groups, each of two segments, each bears the designation "one-eighth" so arranged as to subtend the two segments of the group; and each segment is marked with the designation "one-sixteenth".

For the convenience of the student the groups may be delimited from one another by heavy division lines 14 imprinted across the several bands.

The manner of use will be readily apparent from the foregoing description. The student first backs off the screw 8 to space the head 9 a suitable distance above the top of the body B. When this has been done the segments may be removed from said body in the manner above explained, the segments being removed individually or in groups. To illustrate the use of the device it may be assumed that the teacher directs the class to remove four segments representing the value one-fourth and subtended by the designation "one-fourth". When this has been done she may ask the class to ascertain how many fourths remain and then may ask the class to ascertain how many parts make up the fourth which has been removed. By questions of such character which will readily suggest themselves to an experienced teacher, the class may be quickly given, by actual demonstration, a certain and accurate understanding of the general principles of fractions. When the lesson has been finished the segments which have been removed are replaced and all of the segments are then secured by the screw 8. It is preferable to number or otherwise mark the several segments consecutively so as to enable the same to be readily assembled in their proper order in an annular row about the core and this is accomplished by providing the segments on one or more places with the proper numeral or designation, such for example as the numeral 16 applied to a radial side of one of the segments, as shown in Figure 5, it being understood that the remaining segments are correspondingly numbered or marked and thus facilitate the assembling of the entire set or group of the same around the core or support.

Having fully described my invention, I claim:

1. A device of the character described comprising a body composed of a plurality of separably assembled segments, a supporting core fitted centrally within said body and having a flange projecting from its upper end, each segment having a recess to take over said flange whereby the segment is held against lateral displacement, and releasable means co-operating with the core and the segments to hold the segments against axial displacement.

2. A device of the character described comprising a body composed of a plurality of separably assembled segments, a supporting core fitted centrally within said body and having a flange projecting from its upper end, each segment having a recess to take over said flange whereby the segment is held against lateral displacement, and a screw fitted in the upper end of the core and having a clamping head to engage the segments at their upper sides, thereby to hold them against axial displacement.

3. A device of the character described comprising a body composed of a plurality of separably assembled segments and means for maintaining the assembly of said segments while permitting the removal at will of each segment from the remainder, the body being marked with designations of different fractional values, each designation subtending the number of segments by which the fractional value is constituted.

4. A device of the character described comprising a body of circular cross section and composed of a plurality of separably assembled segments, and a common support for maintaining the assembly of said segments while permitting the removal at will of each segment from the remainder, the body being marked with designations of different fractional values, each designation subtending the number of segments by which the fractional value is constituted.

In testimony whereof I affix my signature.

JAMES B. WOOSTER.